Aug. 20, 1929.  F. M. VAN GELDEREN  1,725,114
WIRE STRIPPER
Filed Nov. 4, 1927
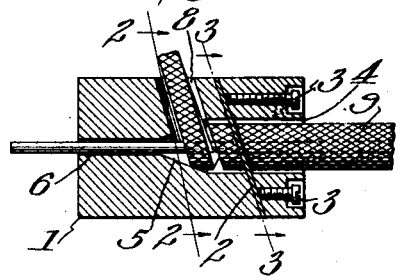
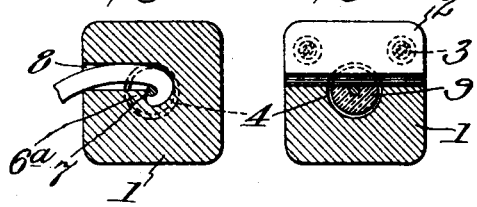
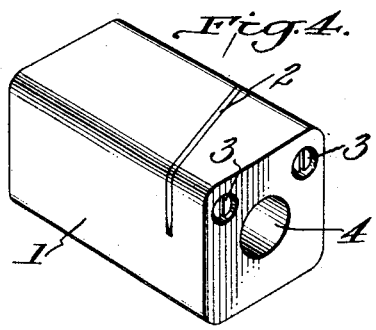
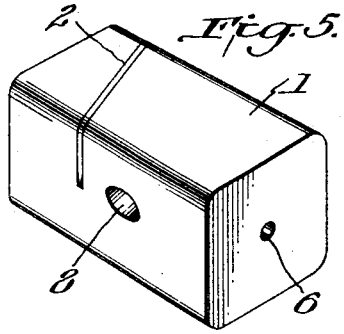
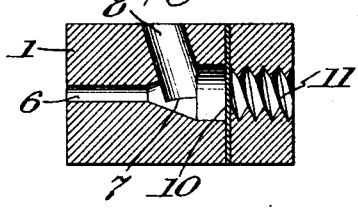
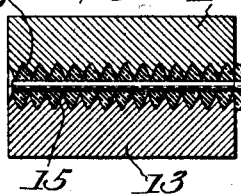
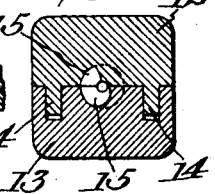
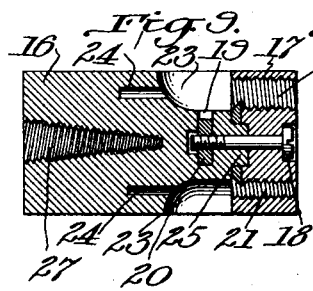
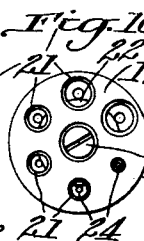
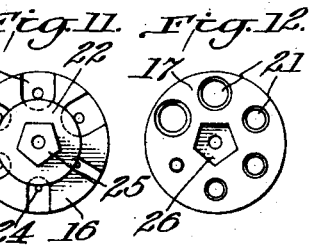
Inventor:
Frederik M. Van Gelderen,
By
Attorney Patented Aug. 20, 1929.

1,725,114

UNITED STATES PATENT OFFICE.

FREDERIK MARINUS VAN GELDEREN, OF ENSCHEDE, NETHERLANDS.

WIRE STRIPPER.

Application filed November 4, 1927. Serial No. 231,077.

This invention relates to wire strippers and particularly to a novel method of and apparatus for removing insulation from covered or insulated wire.

The usual method of removing insulation is to cut through the insulation with a knife or other tool which is passed transversely about the wire, the insulation being then forced off the end of the wire. Whether this operation is performed by hand, with a knife or other portable tool, or by machinery, the wire may be materially weakened by a circumferential cut.

In accordance with the present invention, the insulation is removed by first cutting through the insulation along a helical line, and then removing the insulation by "unwinding" the same as helical wrapping, or by forcing the loosened insulation off the end of the wire.

An object of the invention is to provide apparatus for removing insulation from covered wire by cutting helically along the same. Further objects are to provide convenient forms of hand tools for stripping insulation from wires. A further object is to provide a combination tool for stripping wire ends and for forming wire joints.

These and other objects of the invention will be apparent from the following specification, when taken with the accompanying drawings, in which Fig. 1 is a horizontal section through one embodiment of the invention, Figs. 2 and 3 are transverse sections taken on lines 2—2 and 3—3, respectively, of Fig. 1, Figs. 4 and 5 are perspective views of the device shown in Figs. 1, 2 and 3, Fig. 6 is a horizontal section through a different form, Figs. 7 and 8 are horizontal and vertical sections, respectively, through another modification, Fig. 9 is a horizontal section through a combined wire stripper and wire twister, Fig. 10 is an end elevation of the wire stripper, Fig. 11 is an end elevation of the wire twister with the outer cap removed, and Fig. 12 is an inner end view of the outer cap.

The device as shown in Figs. 1 to 5, comprises a block 1 of porcelain, metal or the like which is of a size and shape to be conveniently gripped in the hand of the workman. The block 1 is provided with a knife blade 2 seated in a slot which extends at a sharp angle to the longitudinal axis of the body, and is retained in place by set screws 3. A passage or bore extends axially of the body and has the form of a cylindrical portion 4 which extends from the entrance end to a point beyond the knife 2, an intermediate tapered portion 5 and an end portion 6 of cylindrical form. The intermediate portion 5 is generally conical but is provided with projection 6a, having a sharp edge 7, which lies along the axis of the bore and is spaced therefrom by a distance slightly greater than the radius of the wire. Adjacent the projection 6a, the body is provided with a transverse passage 8 through which the insulation is removed.

The method of operation will be apparent from Fig. 1. The end of the conductor 9 is introduced into the larger cylindrical passage 4 until the insulation contacts with the knife 2. The wire is then turned within the body, or the body is turned on the wire, and this motion combined with the inclination of the knife 2 feeds the wire into the wire stripper by cutting a helical path through the insulation. When the conductor end reaches the projection 6a, the sharp edge 7 strips the insulation from the wire and deflects it through passage 8 as the bared wire advances through the cylindrical bore 6.

As shown in Fig. 6, the knife 10 is set in a plane normal to the axis of the wire stripper and the entrance to the bore is provided with screw threads 11 for feeding the conductor past the knife. The construction of the wire stripper at the exit side of the knife may be identical with that of the form shown in Figs. 1 to 5, and the parts are therefore identified by like reference numerals. In using the device, the insulation is not only cut along a helical line as it passes the knife 10, but the transverse arrangement of the wide knife blade loosens the insulation from the wire.

The wire stripping device shown in Figs. 7 and 8 consists of two sections 12, 13 which are provided with cooperating lugs and recesses 14 for properly positioning the sections. The sections are each provided with an axial recess 15 along their opposed faces, which recesses are provided with helical ridges forming a continuous screw thread when the sections are assembled. To strip the insulation from a conductor 9, the conductor end is placed between the sections and the latter are pressed together and given a half-turn about the conductor. This operation "threads" the wire stripper upon the conductor by cutting a helical slot through the insulation. The insulation may then be removed by pulling the conductor from the stripper while holding the sections together.

The combination wire stripper and wire twister illustrated in Figs. 9 to 12 is adapted for use with wires of a plurality of widely-different sizes. The tool comprises a main body 16 and an outer cap 17 which are connected by an axial bolt 18, the main body being provided with a slot 19 for receiving a nut 20 when the wire twister is formed of porcelain or other material which will not take the connecting bolt. The outer cap 17 is provided with a series of threaded openings 21 for receiving the ends of conductors of different sizes. A knife 22, preferably of circular form, is clamped between the parts 16 and 17 of the wire twister and the axis of the several openings 21 are so located that the wires will just clear the edge of the knife. The body 16 is provided with recesses 23 and with cylindrical bores 24 opening therefrom in alinement with the several threaded openings. The end walls of the recesses 23 are inclined at a sharp angle to the axis of the wire twister to strip the insulation from a wire as it is fed through the device by the threads of the openings 21. The operation is essentially the same as that described above in connection with the device shown in Fig. 6.

To prevent relative angular movement of the body 16 and cap 17, they are formed with a cooperating axial lug 25 and recess 26. The knife 22 fits over and is provided with an aperture of the same shape as the lug 25 and is therefore restrained from relative angular movement. To permit use of the entire cutting edge of the knife 22 before resharpening, the lug 25 is preferably of such shape that the knife may be positioned to bring different portions of its edge in alinement with the several wire stripping openings. As shown in the drawings the lug 25 has the section of a regular pentagon and six uniformly spaced wire openings 21 are employed. By removing the outer cap, and giving the knife a one-fifth turn, the cutting edge will be moved 12° past each opening 21. The outer end of the body 16 is provided with a slightly tapering and threaded bore 27. The openings 21 and bore 27 are preferably threaded in opposite directions, and as illustrated, the openings 21 are provided with right hand threads while the bore 27 has left hand threads.

When the bared ends of wires are to be joined, the ends are introduced into the bore 27 in parallel or approximately parallel relation, and the tool is pressed upon and rotated upon the wire ends. The tapering of the bore 27 forces the lower ends of the wires into tight engagement, and the threads of the bore grip the wires and twist them into a compact joint as the tool is rotated.

If the surface of the wire should be scratched or cut during the stripping operation, the joints may be formed without weakening the wire when the threading of the wire twister is opposite to that of the wire stripper. In the device illustrated, the twisting pressure exerted upon wires which have right hand helical cuts will not tend to bend the wire parallel to the cut but will tend to close the cut.

Although the invention has been described as embodied in hand tools, it will be apparent that the method may be practiced with power operated machines. It is therefore to be understood that many changes may be made in the constructions herein illustrated and described without departing from the spirit of my invention as set forth in the following claims.

I claim:—

1. A wire stripper comprising a body having a bore therethrough, a knife extending into said bore, and an insulation-stripping projection in said bore beyond said knife, whereby the movement of a rotating wire through said bore progressively cuts and removes a helical strip of insulation from said wire.

2. A wire stripper comprising a body having a bore therethrough, a knife extending into said bore, and an insulation-stripping projection in said bore beyond said knife, said bore being provided with screwthreads for forcing the wire through the bore and past said knife upon relative rotation thereof.

3. A wire stripper comprising a body having a threaded bore, a wire receiving passage in alinement with said bore, a knife on said body and projecting into said bore, and an insulation-stripping projection between said bore and said passage.

4. The invention as set forth in claim 3, in which said knife is provided with an aperture for mounting the same upon a lug formed on said body.

5. A wire stripper comprising a body and a cap, said cap being provided with an opening for receiving an insulated wire, a knife between said body and cap and projecting into said opening, a recess in said body in alinement with said opening, a wire-receiving bore in said body in alinement with said recess and insulation-stripping means adjacent the entrance to said bore.

6. A wire stripper as set forth in claim 5, wherein the inner wall of said opening is screw-threaded for engaging the insulation of the wire, and the said knife extends substantially transverse to the axis of said opening, whereby rotation of the wire advances the same past the knife, the bared wire entering said bore as the stripping means removes the insulation as a helical strip.

7. A wire stripper comprising a body and a cap, said cap being provided with a plurality of openings for receiving covered wires, a knife between said body and cap and projecting into each of said openings, and recesses and wire-receiving bores in said body in alinement with the several openings, the walls of said recesses adjacent the respective bores forming insulation-stripping projections.

8. The invention as set forth in claim 7, wherein said knife is of circular form and provided with a noncircular aperture, and said body has a corresponding noncircular lug upon which said knife may be seated in a plurality of angularly-displaced positions.

9. A removable knife for a wire stripper of the type including a body having means for mounting a knife in cooperative relation to a series of wire-receiving openings, said knife being of circular form and including means for cooperation with the mounting means carried by the body to fix said knife on the body in any one of a plurality of adjustment positions thereon.

10. A removable knife for a wire stripper of the type including a body having an annular series of wire-receiving openings, said knife being of circular form and having a central opening in the form of a regular polygon with a number of sides different from the number of wire-receiving openings in the wire stripper body with which said knife is to be used.

In testimony whereof, I affix my signature.

FREDERIK M. van GELDEREN.